United States Patent
Nguyen et al.

[11] Patent Number: 6,028,745
[45] Date of Patent: *Feb. 22, 2000

[54] HEAD RESTRAINT DEVICE FOR DISK DRIVE

[75] Inventors: Tu Nguyen; Duane Huynh, both of San Jose; Tho Pham, Milpitas, all of Calif.

[73] Assignee: Samsung Electronics Co., Ltd., Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/944,873

[22] Filed: Oct. 6, 1997

[51] Int. Cl.⁷ ................. G11B 21/22; G11B 5/54
[52] U.S. Cl. ................................................ 360/105
[58] Field of Search .................. 360/97.01, 97.02, 360/97.03, 104, 105, 106; 369/222

[56] References Cited

U.S. PATENT DOCUMENTS

| | | |
|---|---|---|
| 4,562,500 | 12/1985 | Bygdnes .................................. 360/105 |
| 4,661,873 | 4/1987 | Schulze .................................... 360/105 |
| 4,703,376 | 10/1987 | Edwards et al. ........................ 360/105 |
| 4,839,756 | 6/1989 | Chew et al. ............................. 360/105 |
| 5,241,438 | 8/1993 | Matsushima ............................ 360/105 |
| 5,274,519 | 12/1993 | Saito et al. .............................. 360/105 |
| 5,319,511 | 6/1994 | Lin .......................................... 360/105 |
| 5,347,414 | 9/1994 | Kano ....................................... 360/105 |
| 5,636,090 | 6/1997 | Boigenzahn et al. ................... 360/105 |
| 5,831,795 | 11/1998 | Ma et al. ................................. 360/105 |
| 5,926,347 | 7/1999 | Kouhei et al. .......................... 360/105 |

*Primary Examiner*—William R. Korzuch
*Attorney, Agent, or Firm*—Blakely Sokoloff Taylor & Zafman; Jeffrey P. Aiello

[57] ABSTRACT

A head restraint that prevents head slapping within a hard disk drive. The disk drive includes a disk that is rotated by a spindle motor. The drive also has a magnetic recording head that is mounted to a flexure arm and magnetically coupled to the disk. The head restraint includes a finger that is moved from an unrestrained position to a restrained position to engage the flexure arm and prevent the head from moving in a direction essentially perpendicular to the disk.

9 Claims, 1 Drawing Sheet

HEAD RESTRAINT DEVICE FOR DISK DRIVE

BACKGROUND OF THE INVENTION

1. Field of the Invention

The present invention relates to a head restraint that prevents a magnetic recording head of a hard disk drive from striking the disk when the drive is subjected to a shock load.

2. Description of Related Art

Hard disk drives contain magnetic recording heads that are magnetically coupled to a rotating magnetic disk(s). Each recording head is typically mounted to a gimbal of a flexure arm. The head, gimbal and arm are commonly referred to as a head gimbal assembly (HGA). The flexure arms are attached to an actuator that has a voice coil. Data is typically stored along a plurality of concentric track across the radius of the disk. The voice coil cooperates with magnets to rotated the arm and move the recording heads across the surfaces of the disk so that the heads can access the various tracks of data.

Each recording head has an air bearing surface that cooperates with a flow of air created by the rotating disk to create an air bearing. The air bearing separates the head from the disk to prevent mechanical wear of the two components.

Hard disk drives are sometimes subjected to external shock loads that can cause the heads to strike or slap the disks. Such an event may damage the heads or the disks. For this reason some disk drives move the heads to a non-data portion of the disks when the drive is powered down. The actuator arm is then latched in place to prevent movement of the heads.

Even when latched into position a shock load may still cause the heads to slap the disks. Although the heads are typically located in a non-data zone, head slapping may still create particles that contaminant the disk and corrupt the drive. It would therefore be desirable to provide a head restraint that prevents the recording heads from striking the disks when the disk drive has unloaded the heads.

SUMMARY OF THE INVENTION

The present invention is a head restraint that prevents head slapping within a hard disk drive. The disk drive includes a disk that is rotated by a spindle motor. The drive also has a magnetic recording head that is mounted to a flexure arm and magnetically coupled to the disk. The head restraint includes a finger that is moved from an unrestrained position to a restrained position to engage the flexure arm and prevent the head from moving in a direction essentially perpendicular to the disk.

DETAILED DESCRIPTION OF THE INVENTION

Figure 1:
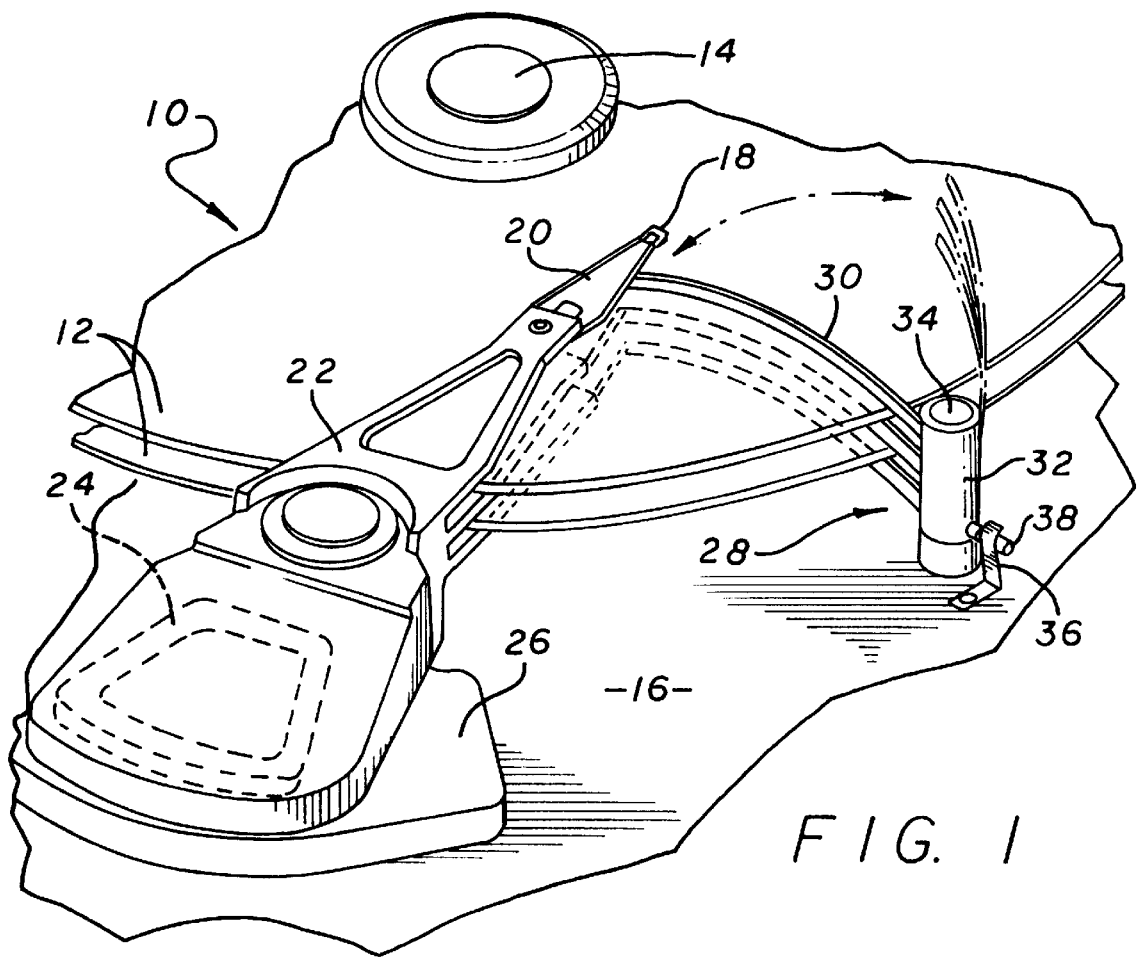
FIG. 1 is a perspective view of a hard disk drive with a head restraint of the present invention.

Referring to the drawings more particularly by reference numbers, FIG. 1 shows a hard disk drive 10. The disk drive 10 includes a plurality of magnetic disks 12 that are rotated by a spindle motor 14. The spindle motor 14 is mounted to a base plate 16 of the drive 10. The disk drive 10 also has a plurality of magnetic recording heads 18. The recording heads 18 are coupled to electrical circuitry (not shown) which allows the heads to both write and read data from the magnetic disks 12.

Each recording head 18 is mounted to a flexure arm 20 and magnetically coupled to an adjacent magnetic disk 12. The recording heads 18 and flexure arms 20 are constructed to create an air bearing between each head 18 and adjacent disk 12 when the disks 12 are rotated by the motor 14.

The flexure arms 20 are attached to an actuator arm 22. The actuator arm 22 has a voice coil 24 that is coupled to a magnet assembly 26 to provide a voice coil motor. Actuation of the voice coil motor rotates the actuator arm 22 and moves the heads 18 across the surfaces of the disks 12.

The disk drive 10 has a head restraint 28 that restrains the movement of the magnetic recording heads 18. The head restraint 28 has a plurality of fingers 30 that extend from a base portion 32. There is typically a finger 30 for each flexure arm 20. The base portion 32 is pivotally connected to a post 34 of the base plate 16. The restraint 28 is preferably constructed from a low cost molded plastic material. The fingers 30 are preferably long enough to engage the recording heads 18 even when the heads 18 are located at the inner diameter of the disks 12.

The head restraint 28 moves between a unrestrained position to a restrained position. The restraint 28 is biased into the restrained position by a torsion spring 36. One end of the torsion spring 36 is mounted to the base plate 16. The other end of the torsion spring 36 is attached to a mounting knob 38 of the head restraint 28.

The rotating disks 12 create a flow of air within the disk drive. The air flow provides a corresponding pneumatic force on the fingers 30 that moves the head restraint 28 from the restrained position to the unrestrained position. When the disks 12 are no longer rotating the spring 36 moves the fingers 30 back to the restrained position so that the fingers 30 are located at the inner diameter of the disks 12.

Figure 2:
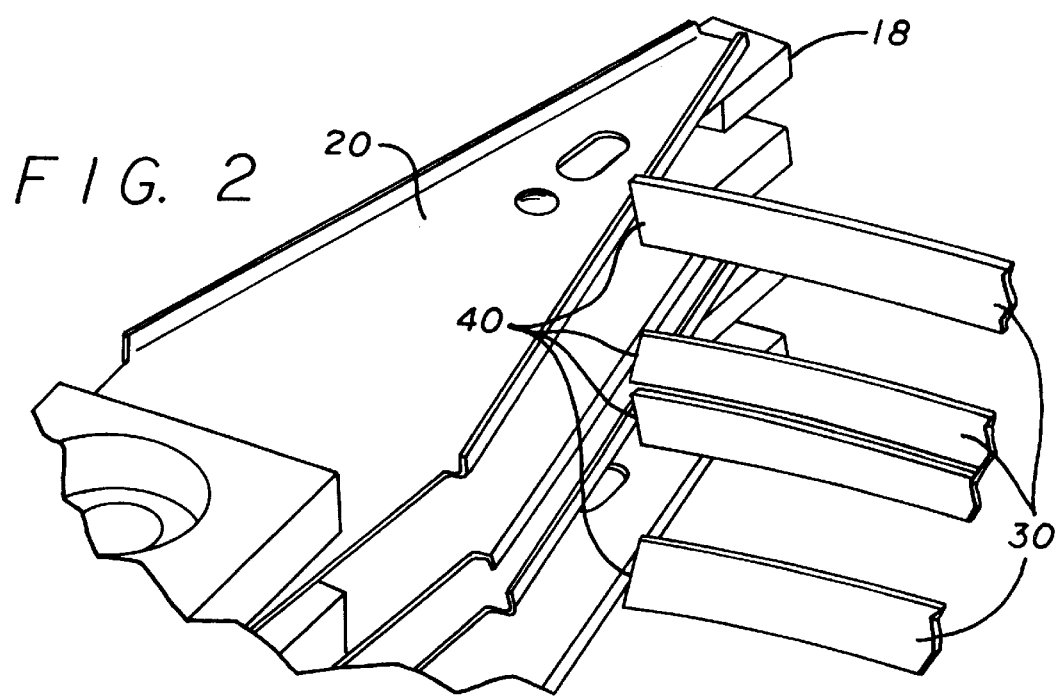
FIG. 2 is a an enlarged view showing the ends of the head restraint engaging a plurality of flexure arms of the disk drive.

As shown in FIG. 2, each finger 30 has a slanted end 40. The ends of the fingers 30 engage the flexure arms 20 and prevent the heads 18 from moving in a direction essentially perpendicular to the disks 12. In one embodiment each finger end 40 is slanted to prevent a movement of the heads 18 away from the disks 12. It being understood that the heads create the most damage when initially moved away from the disk by a shock force and then snap back to strike the disk surface. The head restraint 28 of the present invention thus prevents a head snapping event from occurring. Additionally, the slanted finger ends 40 will compensate for tolerances in both the actuator arm assembly and the head restraint 28. Different tolerances may cause the flexure arms 20 to engage the restraint 28 along different points of the finger ends 40.

In operation, when the disk drive is powered down the voice coil motor moves the heads 18 to a non-data portion at the inner diameter of the disks 12. The disks 12 no longer rotate, whereby the spring 36 moves the fingers 30 to the restrained position. The ends of the fingers 30 engage rails of the flexure arms 20 and prevent the heads 18 from slapping the disks 12. When the disk drive powers back up the disks 12 again rotate to create an air flow that moves the fingers 30 back to the unrestrained position. The voice coil can then move the heads 18 back to the data portions of the disks 12.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:

a disk;

a spindle motor that rotates said disk;

an actuator arm;

a flexure arm that is attached to said actuator arm;

a magnetic recording head mounted to said flexure arm and magnetically coupled to said disk; and, a head restraint that moves between a restrained position and an unrestrained position, said head restraint has a finger with a slanted end that extends from a top surface to a bottom surface of said finger, said finger engages said flexure arm along said slanted end between said top and bottom surfaces and restricts a movement of said magnetic recording head in a direction essentially perpendicular to and away from said disk when said head restraint is in the restrained position.

2. The hard disk drive as recited in claim 1, wherein said head restraint includes a spring that biases said finger into the restrained position.

3. The hard disk drive as recited in claim 2, wherein said head restraint is moved to the unrestrained position by an air flow created by said rotating disk.

4. The hard disk drive as recited in claim 1, wherein said head restraint is in the restrained position when said magnetic recording head is located at an inner diameter of said disk.

5. A hard disk drive, comprising:

a disk;

a spindle motor that rotates said disk;

an actuator arm;

a flexure arm that is attached to said actuator arm, said flexure arm having side rails on opposite sides that extend in a direction away from said disk;

a magnetic recording head that is mounted to said flexure arm and magnetically coupled to said disk; and, a head restraint that moves between a restrained position and an unrestrained position, said head restraint has a finger, said finger engages one of said rails of said flexure arm and restricts a movement of said magnetic recording head in a direction essentially perpendicular to and away from said disk when said head restraint is in the restrained position.

6. The hard disk drive as recited in claim 5, wherein said finger has a slanted end that engages said flexure arm.

7. The hard disk drive as recited in claim 5, wherein said head restraint includes a spring that biases said finger into the restrained position.

8. The hard disk drive as recited in claim 7, wherein said head restraint is moved to the unrestrained position by an air flow created by said rotating disk.

9. The hard disk drive as recited in claim 5, wherein said head restraint is in the restrained position when said magnetic recording head is located at an inner diameter of said disk.

* * * * *